(12) United States Patent
Mukherjee et al.

(10) Patent No.: US 8,046,409 B2
(45) Date of Patent: Oct. 25, 2011

(54) COMMUNICATIONS METHODS, COLLABORATION SESSION COMMUNICATIONS ORGANIZERS, COLLABORATION SESSIONS, AND ARTICLES OF MANUFACTURE

(75) Inventors: Debargha Mukherjee, San Jose, CA (US); Amir Said, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2672 days.

(21) Appl. No.: 10/700,965

(22) Filed: Oct. 31, 2003

(65) Prior Publication Data

US 2005/0097169 A1    May 5, 2005

(51) Int. Cl.
    *G06F 15/16* (2006.01)
(52) U.S. Cl. .................. 709/204; 709/228; 709/231
(58) Field of Classification Search .......... 709/204–206, 709/228, 231–233
    See application file for complete search history.

(56) References Cited

U.S. PATENT DOCUMENTS

| | | | |
|---|---|---|---|
| 5,838,973 A | 11/1998 | Carpenter-Smith et al. | |
| 5,867,654 A | 2/1999 | Ludwig et al. | |
| 5,894,321 A * | 4/1999 | Downs et al. | 370/260 |
| 5,993,314 A | 11/1999 | Dannenberg et al. | |
| 6,288,753 B1 | 9/2001 | DeNicola et al. | |
| 6,647,425 B1 * | 11/2003 | Chaddha | 709/233 |
| 6,697,341 B1 * | 2/2004 | Roy | 370/260 |
| 2002/0142279 A1 | 10/2002 | Thean et al. | |
| 2003/0135863 A1 * | 7/2003 | Van Der Schaar | 725/95 |
| 2003/0163818 A1 | 8/2003 | Armstrong et al. | |
| 2004/0008635 A1 * | 1/2004 | Nelson et al. | 370/260 |
| 2004/0143672 A1 * | 7/2004 | Padmanabham et al. | 709/231 |
| 2004/0236830 A1 * | 11/2004 | Nelson et al. | 709/204 |
| 2004/0249889 A1 * | 12/2004 | Drommond | 709/204 |
| 2005/0086296 A1 * | 4/2005 | Chi et al. | 709/203 |
| 2005/0094732 A1 | 5/2005 | Mukherjee | |
| 2005/0097168 A1 | 5/2005 | Mukherjee | |

OTHER PUBLICATIONS

"System, Method and Format Thereof for Scalable Encoded Media Delivery"; Mukherjee et al.; U.S. Appl. No. 10/196,506, filed Jul. 15, 2002.

"Collaboration Session Communications Methods, Methods of Configuring a Plurality of Collaboration Sessions, Communications Methods, Collaboration Infrastructures, and Communications Systems," Debargha Mukherjee; U.S. Appl. No. 10/418,533, filed Apr. 17, 2003.

"Proposals for End-to-End Digital Item Adaption Using Structured Scalable Meta-formats (SSM)"; Mukherjee et al.; HP Laboratories; Oct. 2002; pp. 1-78.

* cited by examiner

*Primary Examiner* — Albert Decady
*Assistant Examiner* — Darrin Dunn

(57) ABSTRACT

Communications methods, collaboration session communications organizers, collaboration sessions, and articles of manufacture are described. According to one aspect, a communications method includes accessing scalable media data for communication to a plurality of participants, wherein the scalable media data is configured to convey information regarding a subject, accessing a plurality of respective configuration parameters corresponding to respective ones of the participants, first modifying the scalable media data using a configuration parameter for a first recipient of the participants, the first modifying providing a first data stream having a first quantity of data to convey information for the subject, second modifying the scalable media data using a configuration parameter for a second recipient of the participants, the second modifying providing a second data stream having a second quantity of data to convey information for the subject and different than the first quantity of data, and directing the first and the second data streams to respective ones of the first and the second recipient participants.

10 Claims, 3 Drawing Sheets

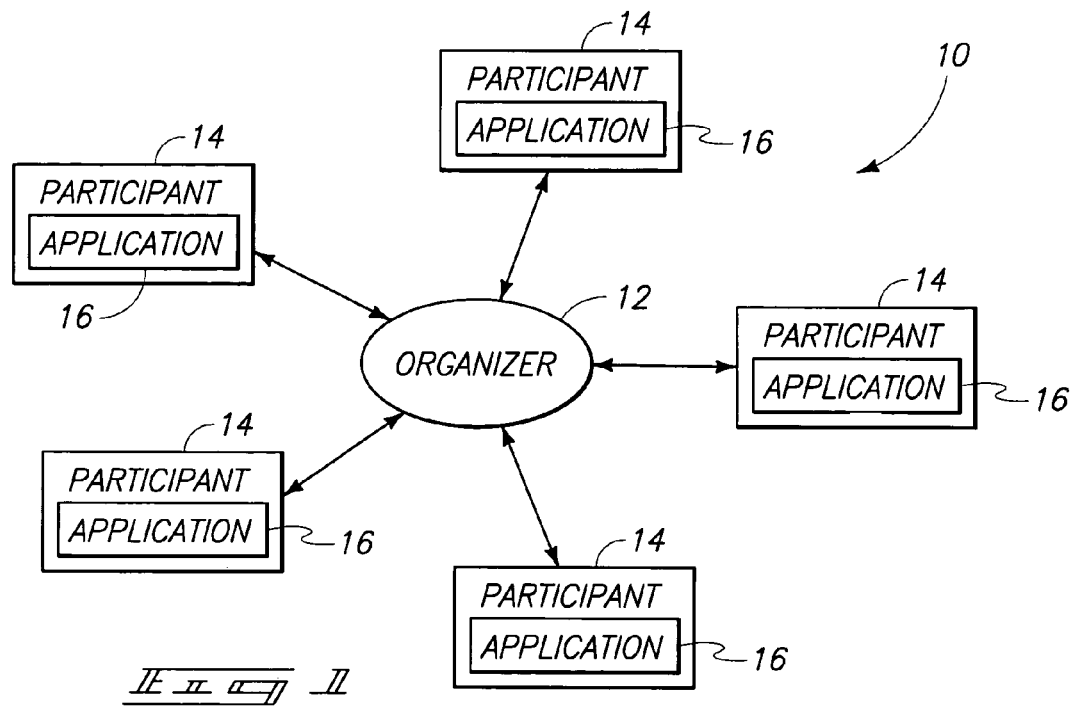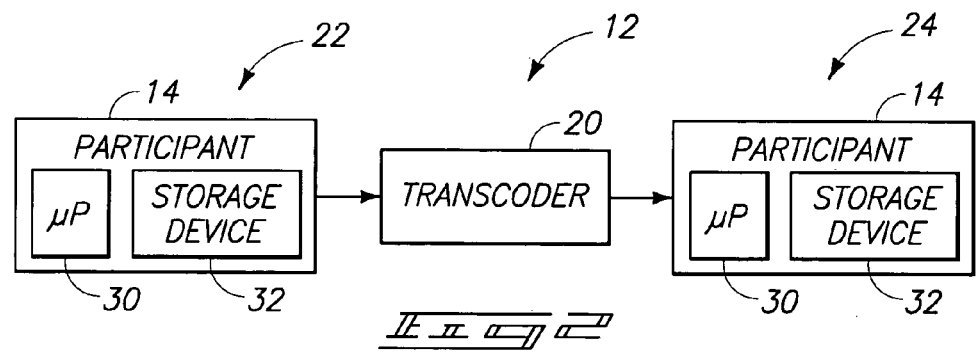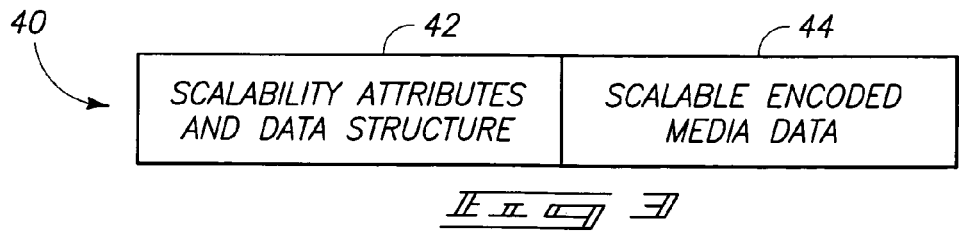

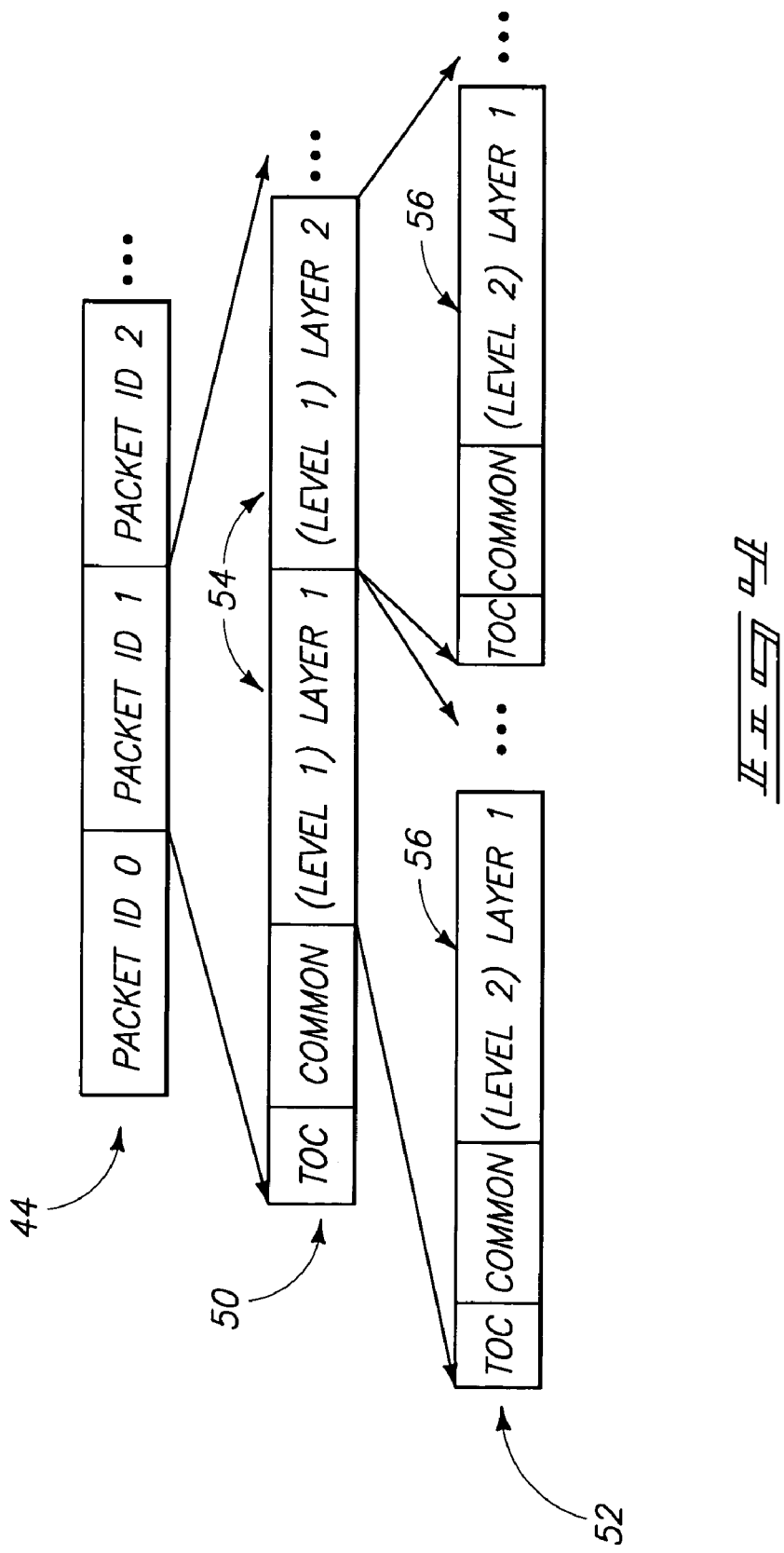

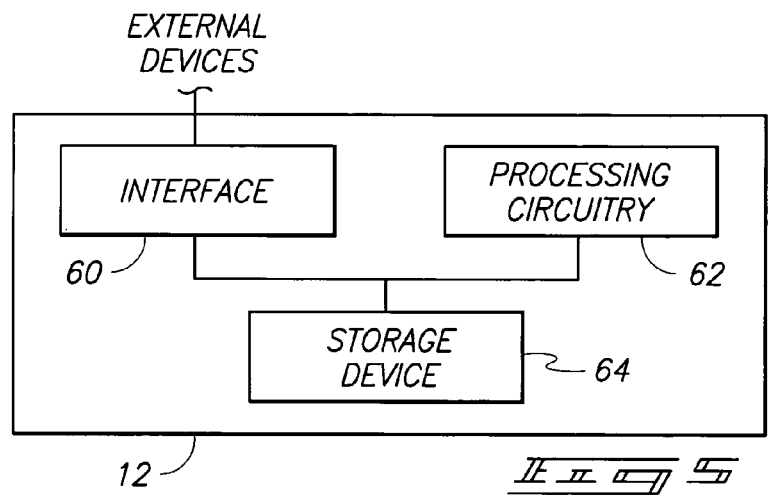
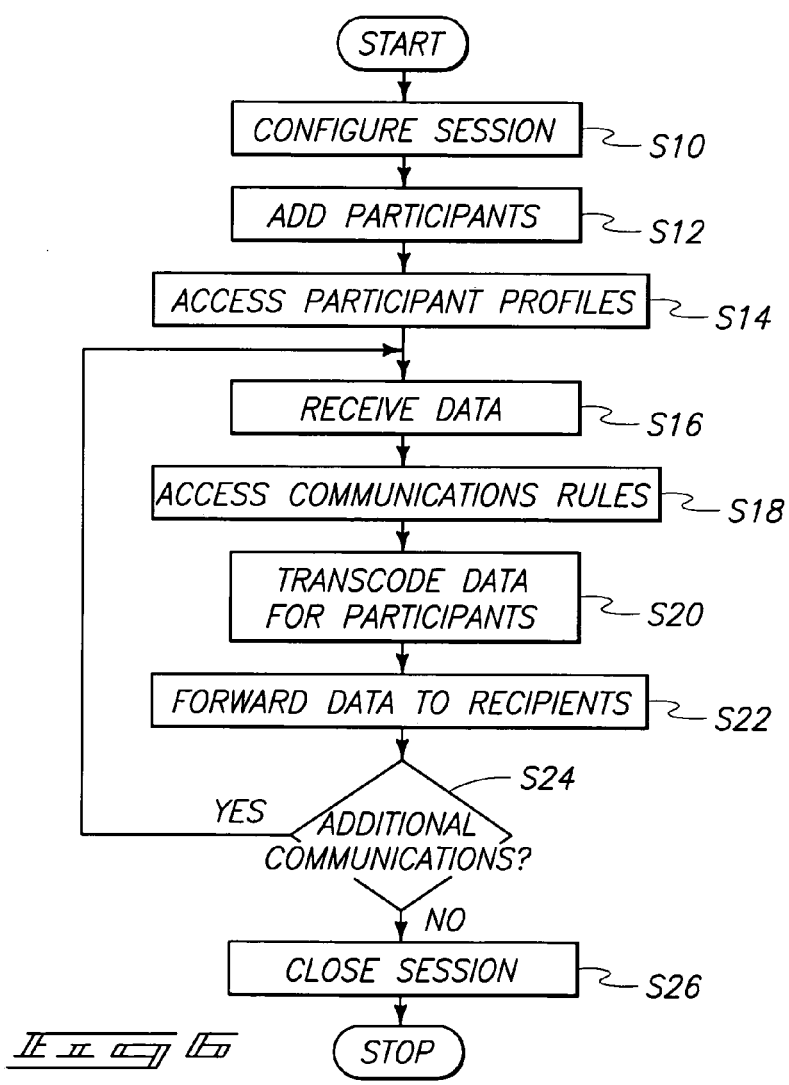

COMMUNICATIONS METHODS, COLLABORATION SESSION COMMUNICATIONS ORGANIZERS, COLLABORATION SESSIONS, AND ARTICLES OF MANUFACTURE

FIELD OF THE INVENTION

Aspects of the invention relate to communications methods, collaboration session communications organizers, collaboration sessions, and articles of manufacture.

BACKGROUND OF THE INVENTION

Collaboration or collaborative sessions, including multimedia collaboration, are being utilized in an increasing number of applications to facilitate exchange of data and information. In an exemplary collaboration scenario, a group of entities communicates over the Internet and exchanges information and media to achieve a specific goal. While initial applications of collaboration sessions included text-based "Chat" and control-based "Network Games," more recent applications provide exchange of bandwidth intensive media in collaborative sessions. The main goal of collaboration sessions includes the exchange of data (including different types of data) between the participants of a session.

Different collaborative applications have different requirements for data flow between participants. For example, a group discussion application may enable every participant to know what another participant is communicating. In contrast, a distance learning application would enable teacher(s) to talk to all or any students, but students should be allowed to talk only to teacher(s) to ask questions. Other arrangements or applications having other rules for data flow are possible.

Real-time multimedia collaboration, defined broadly as real-time multipoint communication and media exchange in dynamically created online groups, has received considerable interest in recent years. While chat, network games, and shared whiteboards have existed for some time, the more recent focus has been upon bandwidth intensive media, such as audio, video, and 3D media in various forms.

Multimedia collaboration may be implemented using the public Internet. The Internet has evolved as a heterogeneous environment with large variances in client connection bandwidths (e.g., first and second generation wireless to high speed optical connections), client processing power (e.g., personal digital assistants (PDAs) to high-end multi-processor machines), and client display capabilities (e.g., PDAs to visualization workstations). These variances between users should remain for some time despite foreseeable improvements in bandwidth, processing power and display capabilities.

In some heterogeneous environments, quality or richness of collaboration may be limited to the lowest common denominator (e.g., presence of a 56 k modem or PDA in the collaboration) where a server is used as the connectivity architecture to route data in collaborative sessions. This model may be considered advantageous inasmuch as there are no dynamic IP or leaf-end bottleneck issues. However, the presence of a relatively slow data connection (e.g., 56 k) or device with a display form factor of a PDA or similar device may limit the quality of the collaboration. For example, pushing data beyond the bandwidth or display limits by higher end machines in the session may potentially block wireless or 56 k connections rendering received data unviewable on PDAs or similar devices.

Some collaboration implementations maintain multiple versions of the same media, and serve one of the versions to each client based on communications capabilities of the client. In these arrangements, the number of versions to be stored may rapidly increase if all types of scalability are to be supported in a real-time collaboration scenario. The number of versions may make creation, handling and delivery impractical. For example, the sender would send multiple different versions for different clients to the management unit. Also, further complications may arise from clients dynamically joining and leaving sessions dynamically using different versions of the data.

At least some aspects of the disclosure provide improved apparatus and methods for implementing communications of media data, including communications involving collaborative sessions.

SUMMARY OF THE INVENTION

Aspects of the invention relate to communications methods, collaboration session communications organizers, collaboration sessions, and articles of manufacture.

According to one aspect, a communications method comprises accessing scalable media data for communication to a plurality of participants, wherein the scalable media data is configured to convey information regarding a subject. The method may include accessing a plurality of respective configuration parameters corresponding to respective ones of the participants, first modifying the scalable media data using a configuration parameter for a first recipient of the participants, the first modifying providing a first data stream having a first quantity of data to convey information for the subject, and second modifying the scalable media data using a configuration parameter for a second recipient of the participants, the second modifying providing a second data stream having a second quantity of data to convey information for the subject and different than the first quantity of data. The method may direct the first and the second data streams to respective ones of the first and the second recipient participants.

According to another aspect of the invention, collaboration session communications organizer comprises an interface configured to communicate with a plurality of participants. The organizer may also include processing circuitry coupled with the interface and configured to implement a plurality of collaboration sessions intermediate a plurality of participants of the respective collaboration sessions, wherein the processing circuitry is configured to associate configuration parameters with respective ones of the participants, to receive scalable media data to be communicated during the collaboration sessions, to scale the media data according to the configuration parameters of respective ones of the participants, and to communicate the scaled media data to recipient participants of the respective collaboration sessions.

Other aspects of the invention are disclosed herein as is apparent from the following description and figures.

DESCRIPTION OF THE DRAWINGS

FIG. 1 is an illustrative representation of an exemplary collaboration infrastructure according to one embodiment.

FIG. 2 is an illustrative representation of transcoding of scalable media data according to one embodiment.

FIG. 3 is an illustrative representation of scalable media data of a bit stream according to one embodiment.

FIG. 4 is an illustrative representation of nested tiers of scalable encoded media data arranged according to one embodiment.

FIG. 5 is a block diagram of an organizer according to one embodiment.

FIG. 6 is a flow chart illustrating an exemplary methodology for implementing communications intermediate a plurality of participants of a collaboration session according to one embodiment.

DETAILED DESCRIPTION OF THE INVENTION

At least some aspects of the disclosure provide configurable collaboration infrastructures for use with diverse users having different terminal capabilities (e.g., diverse communication bandwidths, processing power, display resolutions, etc.). Communications rules of exemplary collaboration sessions described herein may be easily modified to accommodate a wide range of configurations and applications. Exemplary collaboration infrastructures described herein provide sessions of increased security, streamlining of collaborative work in progress, and automatic archival of content. Furthermore, scalable encoding formats may be utilized to permit appropriate transcoding to suit the capabilities and preferences of end participants enabling heterogeneous collaboration.

Referring to FIG. 1, an exemplary collaboration session implemented using a communications system is depicted as reference character 10. Collaboration session 10 refers to data communications within a communications system between a plurality of participants or users. In a more specific exemplary embodiment, collaboration session 10 refers to a multipoint meeting where two or more individual participants communicate by exchange of any information, data, or media concurrently in order to achieve a specific goal. Collaboration session 10 may support multimedia collaboration between a plurality of individuals or entities.

The collaboration session 10 of FIG. 1 uses a collaboration infrastructure comprising a session organizer 12 configured to implement communications within the communications system of the collaboration infrastructure. Organizer 12 may comprise a single server or a plurality of servers (e.g., arranged in a peer-to-peer arrangement) in possible embodiments.

A plurality of participants 14 are coupled with organizer 12. During communications, participants 14 connect to organizer 12 to form collaboration session 10. In one embodiment, the collaboration infrastructure may comprise network connections (e.g., Internet) providing coupling of the participants 14 with organizer 12, and hardware and appropriate programming of participants 14. At a given moment in time, organizer 12 may be arranged to implement a plurality of different collaboration sessions between respective different groups of participants in at least one embodiment.

In one arrangement, participants 14 may comprise devices capable of performing computing and data visualization operations, and may be embodied as personal computers, visualization workstations, personal digital assistants (PDAs), etc. Participants 14 may individually execute a collaboration application 16 which may configure a multipoint collaboration session using an Application Programming Interface (API). Applications 16 may implement communications modules to establish communications (e.g., start or join a session) and provide transcoding operations of data. In one embodiment, applications 16 provide standardized protocols for communications between organizer 12 and participants 14 allowing sessions 10 to be created, participated in, and terminated by users as well as provide exchange of media in a seamlessly scalable manner. Applications 16 may provide collaboration in different ways with different types of media including organizing, transcoding and viewing specific types of content. Accordingly, the communications modules of applications 16 provide connections to organizer 12 so sessions 10 may be initiated, joined, or terminated, as well as sharing and distribution of content using the same collaboration session infrastructure having standardized communications protocols in one embodiment.

In one embodiment, collaboration sessions 10 may be configured remotely either at the start of the respective session or prior to the start of the respective session by specifying communications rules in one embodiment. Additional details regarding configuration of collaboration sessions using communications rules according to one embodiment are described in a co-pending U.S. patent application entitled "Collaboration Session Communications Methods, Methods Of Configuring A Plurality Of Collaboration Sessions, Communications Methods, Collaboration Infrastructures, And Communications Systems," listing Debargha Mukherjee as inventor, having U.S. patent application Ser. No. 10/418,533, filed Apr. 17, 2003, and the teachings of which are incorporated by reference herein. For example, communications rules may be provided or conveyed to organizer 12 from one of the participants 14 (e.g., a collaboration session creator or master) using relevant protocols, and thereafter data flow through the organizer 12 is controlled in accordance with the respective communications rules specified.

In one possible model, the session master participant 14 configures and starts a collaboration session 10 by providing session information, such as password(s), session time, session name, etc. to a list of invitee participants 14 prior to the session 10, for example, using email. Then, at the specified time, the appropriate participants 14 connect to organizer 12 and configure and start the respective collaboration session 10. Invited participants 14 may join or leave a session 10 at will in one embodiment.

The configuration of a collaboration session 10 may include providing respective communications rules described above. Participants 14 may exchange information using communications rules previously specified. Communications rules may control the communications based upon the respective collaboration session 10 (e.g., network-based chat, network gaming, remote teacher-student arrangements, etc.). In one implementation, the communications rules may specify that only some of the participants 14 may be considered active and have transmit capabilities while others may be referred to as passive to only receive transmitted data. The communications rules may specify or identify appropriate recipient participants to receive a given communication. In one embodiment, the communications rules may be based upon the identity of the originating participant of the data. For example, if data is communicated from a given originating participant and addressed to a given recipient participant, the communications rules may specify communication of the data to other non-specified participants as well based upon the identify of the originating participant. Further, the communications rules may restrict communications from given participants to specified recipient participants 14 based upon the identity of the originating participant.

In some arrangements, the communications rules may provide a one-many collaboration session 10 wherein only the session master or other participant 14 is permitted to transmit, and the other participants 14 are passive to receive the transmissions. In a one-many-one collaboration session 10, the session master participant 14 transmits to all participants 14 and the other participants 14 can only transmit to the session master participant 14. In a many-many collaboration session 10, everybody transmits to all other participants 14. Other collaboration sessions are possible as configured by the communications rules. Further, different transmission capabilities may be assigned to individual participants 14 based upon the session password communicated to them. A lowest password may only allow a given participant to receive, and a next higher password may allow a given participant to receive and to only transmit back to a session master participant, and the highest password may allow reception combined with transmission to everyone else. Further examples and details of possible exemplary configurations are described in the U.S. patent application Ser. No. 10/418,533.

Once collaboration has reached a logical conclusion, the session master participant 14 may terminate the session in one arrangement. Applications 16 of individual participants 14 may create a dynamic Virtual Private Network for seamless collaboration over existing protocols created by the session master participant in one embodiment. The dynamic VPN evolves as participants 14 join or leave a session 10 and may be terminated by the session master participant 14 when appropriate.

In one embodiment, a plurality of different groups of participants 14 having different transmission and/or receiving capabilities (e.g., specified by the communications rules) are supported within a single one of collaboration sessions 10 in order to support a wide variety of collaborative applications. A subset of participants 14 having common transmission and reception capabilities as specified by the communications rules in the same collaboration session 10 may be referred to as a participant group. Organizer 12 is configured to enforce the communications rules during communications of participants 14 using the participant group. In at least one embodiment, communications rules may be arranged to configure organizer 12 to implement different collaboration sessions 10 at different moments in time.

Organizer 12 is configured to implement a heterogeneous collaboration session 10 in one aspect wherein organizer 12 communicates with participants 14 having different communications or display capabilities. For example, different communication attributes may correspond to the specific implementations or configurations of the present participants 14 which may vary widely in a given collaboration session 10. In a given session 10, participants 14 may have different communications or display capabilities corresponding to the respective network connections providing different rates of data transfer for the participants 14, different internal processing circuitry (e.g., microprocessor executing respective software or other programming) of participants 14 providing different processing powers, different resolutions of displays of participants 14, etc. Organizer 12 is configured to implement collaboration session 10 providing communication of scalable media data with respect to the heterogeneous participants 14 wherein the participants 14 with limited abilities do not adversely impact communications with respect to participants 14 having greater abilities in one embodiment.

Aspects of the disclosure provide scaling of media data by organizer 12 and communication of the scaled data intermediate participants 14 within a given collaboration session 10 to provide heterogeneous communications. For example, scalable media data enables communications intermediate participants 14 having different capabilities (e.g., bandwidth, processing power, display resolution, etc.). Scalable encoding formats and meta-formats are described in "Proposals for End-To-End Digital Item Adaptation Using Structured Scalable Meta-Formats (SSM)," listing Debargha Mukherjee, Geraldine Kuo, Amir Said, Girodano Beretta, Sam Liu, and Shih-ta Hsiang as authors, (published October, 2002), and a co-pending U.S. patent application entitled "System, Method and Format Thereof For Scalable Encoded Media Delivery," listing Debargha Mukherjee and Amir Said as inventors, having U.S. patent application Ser. No. 10/196,506, filed Jul. 15, 2002, and the teachings of which are incorporated herein by reference.

For example, participants 14 may communicate a respective profile to organizer 12 prior to communications in a collaboration session 10 (e.g., upon session creation or a participant 14 joining a session 10) or at another moment in time. The profile may define one or more configuration parameter for the respective communicating participant 14 defining one or more maximums for one or more individual levels of scalability that the respective device 14 can receive and process. Exemplary configuration parameters comprise receiving attributes corresponding to the abilities of the respective participant 14 to receive, process or display the media data. Exemplary receiving attributes may be defined by or include one or more of communications bandwidth, processing speeds, or display resolution with respect to the participant 14. Exemplary receiving attributes may also be referred to as outbound constraints and include limit constraints (i.e., limiting values for attribute measures) and optimization constraints (e.g., requested minimization or maximization of attribute measures) as discussed in the U.S. patent application Ser. No. 10/196,506. In another embodiment, organizer 12 senses the configuration parameters of respective recipient participants 14.

Profiles may convey terms of meaningful defined levels such as signal-to-noise ratio (SNR), resolution, temporal and interactivity to implement scaling operations. Additional levels may be defined and used in other embodiments. The profiles may convey specifications for these or other qualities in a top-down order by means of a 4-tuple in one embodiment (e.g., a resolution profile of 1 conveys that the respective recipient participant 14 is able to receive the highest resolution, a resolution profile of 2 conveys abilities to receive the second highest resolution and so on).

Media data routed through organizer 12 may contain the levels in any nesting order. A header in the bit stream may specify how many scalability levels there are and in what order they occur in the bit stream for the respective participant 14.

Organizer 12 is arranged to access the profiles for the respective participants 14 and to scale media data communicated to the respective participants 14 in accordance with receiving attributes of the participants 14 providing a plurality of respective scaled data streams for communication to participants 14. For example, organizer 12 may compare the levels of a bit stream with the profile for respective participants 14 and rearrange the respective bit streams accordingly. Organizer 12 may accomplish the rearrangement irrespective of nesting order if the bit stream conforms to the scalable media format. As shown in FIG. 4 below, media data may be transmitted in packets wherein individual packets correspond to transmission instances conforming to a scalable meta-format. A tag in a packet header inserted by application 16 of an originating participant 14 may specify the type of media being represented and the application 16 of the recipient participant 14 may provide appropriate decoding and display.

Referring to FIG. 2, exemplary communications intermediate plural participants 14 using organizer 12 are shown. An originating participant of media data is identified as reference character 22 and a recipient participant of media data is identified as reference character 24. In the illustrated embodiment, individual participants 14 comprise processing circuitry 30, such as a microprocessor, which may be configured to implement programming stored within a respective storage device 32. Storage devices 32 may be configured to store electronic data and/or programming such as executable instructions (e.g., software and/or firmware), data, or other digital information and may include processor-usable media. Exemplary programming includes applications 16 in one embodiment. Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Originating participant 22 is configured to provide media data for communication in collaboration session 10 according to a scalable format. Details of an exemplary scalable format are described with respect to FIG. 3 in one embodiment. The scalable media data is communicated to organizer 12 comprising a transcoder 20 in the depicted configuration. Transcoder 20 accesses the received scalable media data and is configured to transcode the data in accordance with configuration parameters of the recipient participant 24 provided to organizer 12. Transcoding of the media data operates to scale the media data in accordance with the communications and terminal capabilities of the recipient participant 24. The transcoded (i.e., scaled) media data is communicated from organizer 12 to recipient participant 24.

Although not shown in FIG. 2, another recipient participant may be present having respective different communications and terminal capabilities and associated receiving attributes described below. Transcoder 20 may operate to simultaneously transcode the same media data according to the configuration parameters of the unillustrated recipient participant and communicate the respective transcoded data to the unillustrated recipient participant in parallel with the communications to the illustrated recipient participant 24 providing heterogeneous communications. The scaled media data communicated to the plural recipient participants 14 may comprise plural digital data streams having different amounts of data usable to depict the same subject (e.g., different amounts of content providing different resolutions of the subject). In one embodiment, the media data may be scaled using different scalability attributes for different recipient participants as described further below.

Referring to FIG. 3, one possible embodiment of a format 40 of scalable media data provided by an originating participant 22 is illustrated. The format 40 may comprise a non-media type specific format for scalable encoded media data in one arrangement. Exemplary encoded media data may be compressed (e.g., in accordance with JPEG2000 encoding) and encrypted in one embodiment.

The depicted format 40 comprises a first portion 42 and a second portion 44 in accordance with the content-agnostic meta format of the described embodiment. Format 40 allows multiple-levels of scalability to co-exist in a bit stream, and allows rearrangement tasks to produce bit streams of different scales and quality without knowing the actual content or compression scheme applied. In an embodiment wherein all media data is routed through organizer 12, the organizer 12 may supply different subsets of data to different participants 14 based upon the respective configuration parameters of the respective recipient participants 14.

First portion 42 corresponds to non-media type specific scalability attributes and second portion data structure information, and second portion 44 corresponds to original scalable encoded media data arranged in non-media type specific indexable structure. More specifically, exemplary non-media type specific scalability attributes may include attributes common to all media types and may include size of a bit stream, SNR and processing power used to process and experience data of the bit stream in one embodiment. Scalability attributes may be used to implement appropriate scaling of the media data. First portion 42 also includes non-media type specific data structure information of second portion 44 and comprising dimensions of a multi-dimensional representation of the scalable media data of second portion 44 in one embodiment.

Second portion 44 corresponds to scalable media data arranged in a content independent indexable data structure in the described embodiment. The media data is arranged into a generic format regardless of content of the media data permitting generic transcoding wherein the transcoding operations are performed without knowledge of the data content and without decrypting or decoding the media data enabling a single infrastructure (e.g., organizer 12) to deliver the media data according to a plurality of scales in one embodiment. Transcoder 20 may implement scaling operations during transcoding including one or more of bit truncation, bitstream skips, or bit repacking. Further details regarding exemplary scalable formats are described in the U.S. patent application having Ser. No. 10/196,506.

Referring to FIG. 4, indexable concepts of second portion 44 of a bit stream of media data are described according to one embodiment. The second portion 44 comprises a plurality of packets in the depicted embodiment. The exemplary embodiment of FIG. 4 includes a plurality of nested tiers or levels 50, 52 of abstraction to implement data scaling operations. The data is indexable using a plurality of table of contents (TOCs) where individual levels 50, 52 are indexable by respective TOCs. TOCs provide random access and facilitate identification of subsets for dropping or truncating during transcoding operations.

First tier 50 includes first and second bit-stream subsets 54. Scalability of media data may be achieved by grouping subsets to provide scalability to a particular tier. For example, a first scalability may be provided by only the first subset 54 while a second scalability may be provided by the first and second subsets 54. Further, individual subsets 54 may be further scaled using subsets 56 of level 52 and additional levels may also be provided to enable further scaling. The type of scalability implemented by respective levels 50, 52 corresponds to the content of the data of the respective levels 50, 52. One example of a multi-tier scalable bit-stream is a JPEG2000 bit-stream in RLCP progression mode wherein the highest level 50 corresponds to resolution scalability and within individual resolution scalable subsets are nested a second level of signal-to-noise ratio subsets. Alternately, in the LRCP progression mode of JPEG2000, the highest level is SNR and within SNR layers there are nested resolution layers. Exemplary scalability attributes for scaling include resolution, SNR, temporal, and interactivity as described in the U.S. patent application having Ser. No. 10/196,506. Additional scalability attributes may be used for scaling in other embodiments. In addition, one or more different scalability attributes may be used to scale a given dataset of media data for different recipient participants 14 of a given collaboration session 10.

Scaling is implemented in the described embodiment using configuration parameters comprising receiving attributes of the recipient participants 14 and the scalability attributes of the media data. For example, transcoder 20 may access the respective receiving attributes for one or more appropriate recipient participants 14 to receive the data, match the scalability attributes and the respective receiving attributes, and scale the media data using the matched attributes to truncate, rearrange or otherwise modify the media data to provide the respective data stream(s) for communication. Further details regarding scaling in one embodiment are described in the U.S. patent application having Ser. No. 10/196,506. Other scaling configurations are possible.

Scaling enables heterogeneous participation in collaboration session 10. The originating media data provides data which may comprise images, video, animation, etc. of a subject. Scaling of the media data provides a plurality of bit streams which may have different quantities of data content usable for representation of the subject by recipient participants 24.

Referring to FIG. 5, an exemplary configuration of organizer 12 embodied as a server is shown. The depicted organizer 12 includes an interface 60, processing circuitry 62, and a storage device 64. Other embodiments are possible.

Interface 60 is configured to implement bidirectional communications with respect to participants 14. Exemplary configurations of interface 60 include a network interface card, access point, or any other appropriate structure for implementing bidirectional communications.

In one embodiment, processing circuitry 60 may comprise circuitry configured to implement desired programming. For example, the processing circuitry 60 may be implemented as a processor or other structure configured to execute executable instructions including, for example, software and/or firmware instructions. Other exemplary embodiments of processing circuitry 60 include hardware logic, PGA, FPGA, ASIC, and/or other structures. These examples of processing circuitry 60 are for illustration and other configurations are possible. Programming may configure processing circuitry 60 to access bit streams conforming to the format 40 and provide manipulations of the bit stream to create content suitable for different connections and capabilities.

Similar to storage devices 32 described above, storage device 62 may comprise processor-usable media configured to store programming arranged to cause organizer 12 to arrange and conduct collaboration sessions 10 including implementing transcoding operations. Storage device 62 may also buffer the media data or store any other appropriate digital information.

Referring to FIG. 6, an exemplary methodology performed by organizer 12 and participants 14 to implement a collaboration session 10 according to one embodiment is shown. Other methods are possible including more, less or alternative steps. Further, the ordering of one or more illustrated steps may occur in different sequences in other arrangements.

At a step S10, a collaboration session is configured by a session master participant. The configuration process may identify the respective participants and define the communications rules for the respective collaboration session.

At a step S12, the participants logon or couple with organizer 12. The participants may supply predefined passwords for authentication and which may also operate to specify the communications rules for the respective participants.

At a step S14, authenticated participants may communicate respective profiles to the organizer and regarding respective receiving attributes of the participants used to implement scaling operations by the organizer.

At a step S16, the organizer receives scalable media data from an appropriate originating participant. The scalable media data may be formatted according to FIGS. 3 and 4 in one embodiment.

At a step S18, the organizer accesses the communications rules to identify appropriate recipient participants to receive the scalable media data. For example, the originating participant may identify a single group of recipient participants, and based upon the communications rules, one or more additional group of participants may also be identified to receive the scalable media data.

At a step S20, the organizer operates to scale the media data according to the receiving attributes of the identified recipient participants. The above-described exemplary transcoding may be used in one embodiment to scale the media data providing a plurality of respective data streams having different quantities of data content for a subject.

At a step S22, the organizer outputs the data streams in parallel to the appropriate recipient participants. Upon receipt, the applications of the individual recipient participants may transcode the received data streams and communicate the data to the respective users.

At a step S24, the organizer monitors for the presence of additional communications. The method returns to step S16 if step S24 is affirmative. If step S24 is negative, the method proceeds to step S26.

At step S26, the organizer terminates the collaboration session.

At least some aspects of the disclosure provide a lightweight, easy-to-use framework for collaboration over relatively small-scale heterogeneous networks using scalable media data. The utilization of scalable media transport enables users of widely varying capabilities in connection bandwidths, processing powers, display capabilities, etc. to participate in a multipoint session without degrading the experience for those with faster data connections or more powerful processing machines. At least some aspects provide a content independent architecture which may be used for a vast majority of collaborative applications. Organizers of collaboration sessions may be implemented using generic servers and applications of individual participants may be arranged to communicate with one another by agreeing on content-level protocols such as mime headers for web-pages. In one described embodiment, the organizer may handle transcoding of generic scalable content as well as common tasks in generic collaborative applications. This embodiment takes session management and access control load from participant application developers facilitating application development. Use of multiple session modes (e.g., many-many, one-many, one-many-one, etc.) also enables a wide variety of collaborative applications with the same infrastructure framework. For example, many-many is advantageous for meetings or brainstorming, one-many-one is applicable for distance learning or training where students may only interact with the teacher, and one-many is applicable for presentation and speech broadcasts with no feedback. In sum, at least some described aspects support commonalities in all collaborative applications leaving specifics to application developers.

The protection sought is not to be limited to the disclosed embodiments, which are given by way of example only, but instead is to be limited only by the scope of the appended claims.

What is claimed is:

1. A communications method comprising:

accessing scalable media data for communication to a plurality of participants, wherein the scalable media data is configured to convey information regarding a subject;

accessing a plurality of respective configuration parameters corresponding to respective ones of the participants;

first modifying the scalable media data using a configuration parameter for a first recipient of the participants, the first modifying providing a first data stream having a first quantity of data to convey information for the subject;

second modifying the scalable media data using a configuration parameter for a second recipient of the participants, the second modifying providing a second data stream having a second quantity of data to convey information for the subject and different than the first quantity of data, wherein the first and the second data streams individually comprise different quantities of data providing images of different resolutions of the subject;

directing the first and the second data streams to respective ones of the first and the second recipient participants;

accessing communications rules for a collaboration session; and identifying the first and the second recipient participants using the communications rules.

2. The method of claim 1, wherein the accessing comprises accessing the scalable media data configured to be scaled according to at least one scalability attribute, and the configuration parameters comprise receiving attributes for respective ones of the first and the second recipient participants.

3. The method of claim 2, further comprising matching the scalability attribute and the receiving attributes for respective ones of the first and the second recipient participants, and wherein the first and the second modifyings are responsive to the matching.

4. The method of claim 1, wherein the accessing scalable media data comprises accessing media data which may be scaled according to a plurality of different scalability attributes, and the first and the second modifyings comprise modifying according to different scalability attributes.

5. A collaboration session communications organizer comprising:

an interface configured to communicate with a plurality of participants; and processing circuitry coupled with the interface and configured to implement a plurality of collaboration sessions intermediate a plurality of participants of the respective collaboration sessions, wherein the processing circuitry is configured to associate configuration parameters with respective ones of the participants, to receive scalable media data to be communicated during the collaboration sessions, to scale the media data according to the configuration parameters of respective ones of the participants, and to communicate the scaled media data to recipient participants of the respective collaboration sessions;

wherein the processing circuitry is configured to access communications rules for respective ones of the collaboration sessions, and to use the communications rules to identify one or more of the recipient participants which are to receive the scaled media data during respective ones of the collaboration sessions, wherein the communications rules identify the one or more recipient participants which are different than any recipients identified by an originator of the scalable media data.

6. The organizer of claim 5, wherein the scalable media data comprises data usable to represent content of a subject at a plurality of different scales comprising different quantities of data.

7. The organizer of claim 5, wherein the processing circuitry is configured to scale the media data to provide a plurality of data streams comprising different quantities of data regarding a common subject, and to communicate the data streams to respective ones of the recipient participants.

8. The organizer of claim 5, wherein the interface is configured to receive profiles from respective ones of the recipient participants and comprising the configuration parameters defining receiving attributes for the respective ones of the recipient participants which correspond to scalability attributes of the scalable media data.

9. The organizer of claim 8, wherein the processing circuitry is configured to scale the media data according to at least one of the scalability attributes and the receiving attributes for the respective recipient participants.

10. A communications method comprising:

accessing scalable media data for communication to a plurality of participants, wherein the scalable media data is configured to convey information regarding a subject;

accessing a plurality of respective configuration parameters corresponding to respective ones of the participants;

first modifying the scalable media data using a configuration parameter for a first recipient of the participants, the first modifying providing a first data stream having a first quantity of data to convey information for the subject;

second modifying the scalable media data using a configuration parameter for a second recipient of the participants, the second modifying providing a second data stream having a second quantity of data to convey information for the subject and different than the first quantity of data;

directing the first and the second data streams to respective ones of the first and the second recipient participants;

accessing communications rules for a collaboration session;

identifying the first and the second recipient participants using the communications rules; and directing a third data stream to a third recipient participant which is identified by an originator of the scalable media data, and wherein the first and the second recipient participants are not identified by the originator of the scalable media data.

* * * * *